United States Patent
Koch et al.

[11] Patent Number: 5,921,629
[45] Date of Patent: *Jul. 13, 1999

[54] AIRCRAFT DIVAN

[75] Inventors: Roger Koch, Miami Shores; Michael L. Oleson, Ft. Lauderdale; Daryl Soderman, Miami, all of Fla.

[73] Assignee: Aircraft Modular Products, Inc., Miami, Fla.

[ * ] Notice: This patent is subject to a terminal disclaimer.

[21] Appl. No.: 08/840,431

[22] Filed: Apr. 29, 1997

Related U.S. Application Data

[63] Continuation-in-part of application No. 08/304,799, Sep. 12, 1994, Pat. No. 5,624,160.

[51] Int. Cl.⁶ .................. A47C 5/64; A47C 7/02; B60N 2/04
[52] U.S. Cl. .................. 297/344.1; 297/452.2; 297/440.16; 410/105; 248/503.1; 248/429; 244/118.6
[58] Field of Search .................. 297/440.1, 452.2, 297/452.48, 440.16, 452.55; 52/655.1, 656.9, 280; 403/403, 363, 231, 280; 244/118.6, 122 R, 118.5; 410/105, 104, 80, 81, 77; 248/503.1, 429

[56] References Cited

U.S. PATENT DOCUMENTS

| | | | |
|---|---|---|---|
| 3,986,459 | 10/1976 | Riley | 248/429 |
| 4,109,891 | 8/1978 | Grendahl | 248/503.1 |
| 4,114,947 | 9/1978 | Nelson | 248/503.1 |
| 4,697,847 | 10/1987 | Herschlag | 297/440.1 |
| 5,058,829 | 10/1991 | Bentley | 244/118.6 |
| 5,383,630 | 1/1995 | Flatten | 244/118.6 |

*Primary Examiner*—Peter M. Cuomo
*Assistant Examiner*—Anthony D. Barfield
*Attorney, Agent, or Firm*—Malloy & Malloy, P.A.

[57] ABSTRACT

An aircraft divan, for use within a passenger compartment of an aircraft, that includes a strong rigid base structure adapted to be secured to a support surface within the aircraft and including a plurality of substantially strong, yet lightweight frame members. A plurality of substantially strong, yet lightweight connectors, each one of the connectors being structured and disposed to connectingly receive at least two of the frame members, including an exterior wall structure defining at least one interior cavity and at least two frame member receiving openings, and comprising a first interlocking segment and a second interlocking segment, the first interlocking segment structured to at least partially receive the second interlocking segment and the first and second interlocking segments being structured to be interlockingly connected with one another in sandwiching relation about at least one end zone of the frame members. Moreover, each of the frame member receiving openings is structured and disposed to receive and surround one of the end zones of one of the frame members therethrough and to maintain the end zone of the frame member fastened in a secured, fixed position within the interior cavity of the connector.

14 Claims, 4 Drawing Sheets

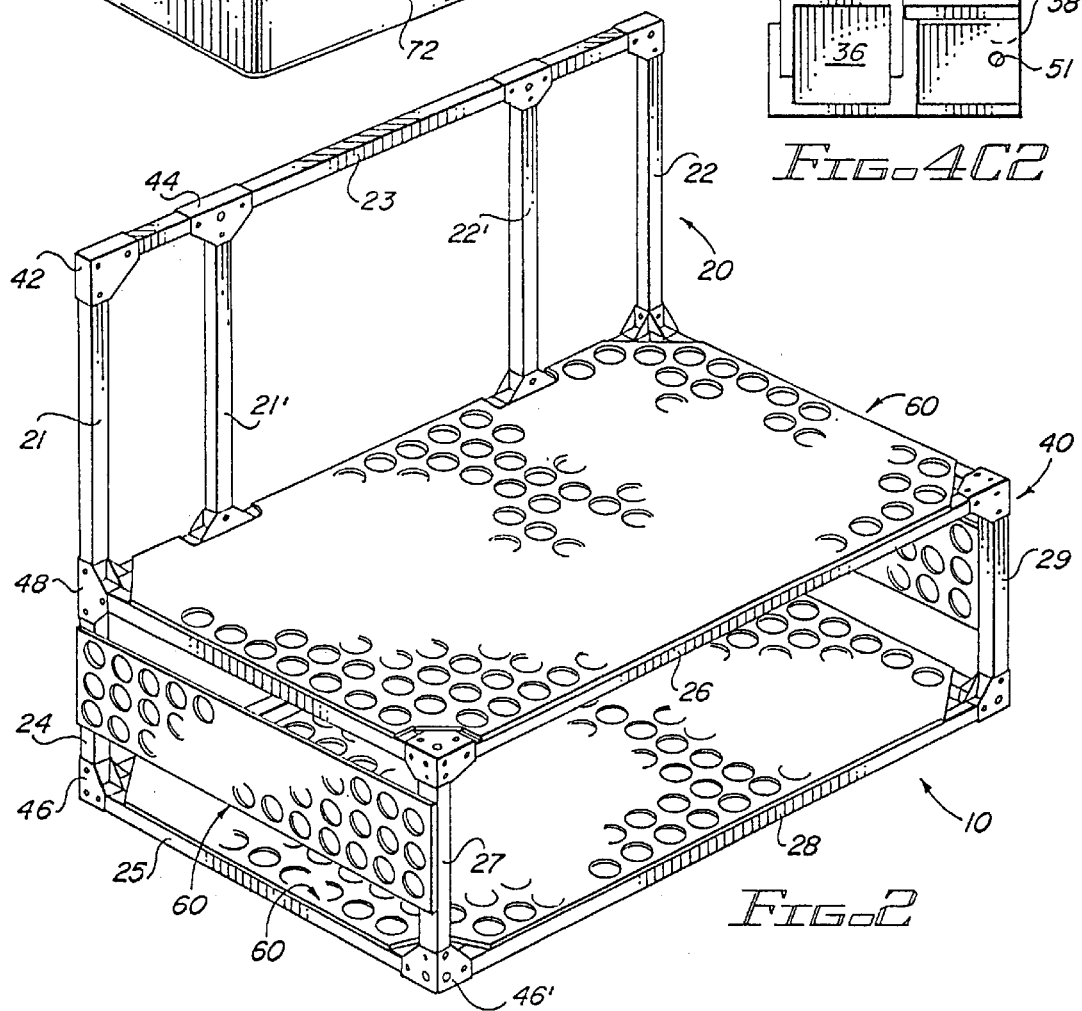

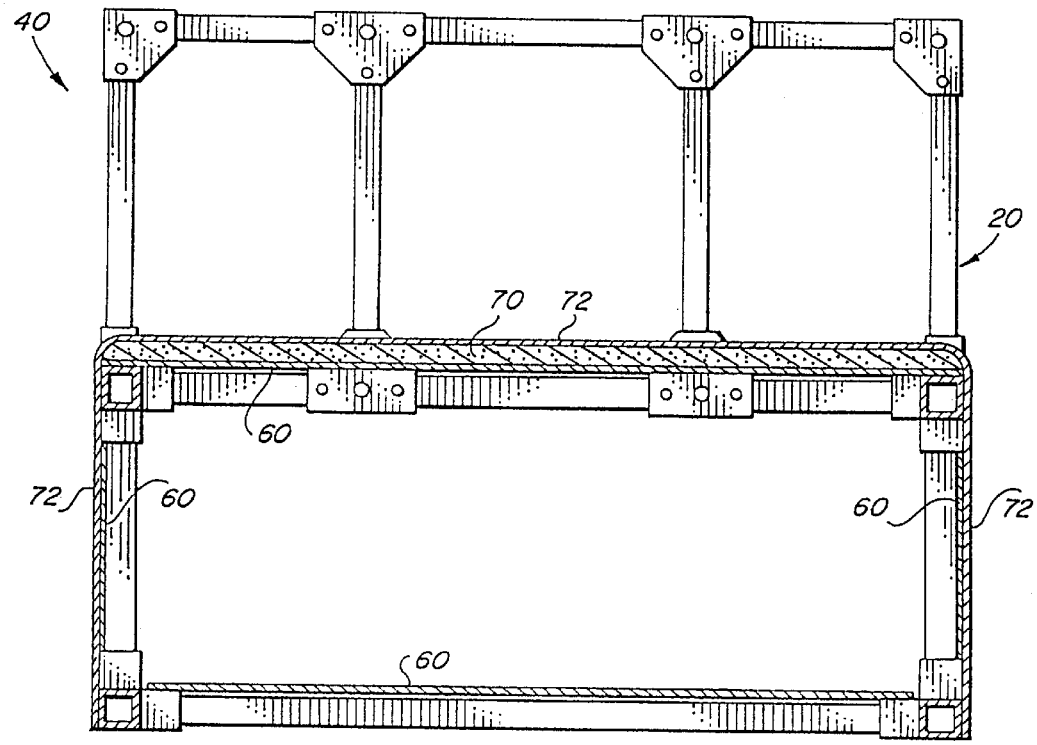
FIG. 3
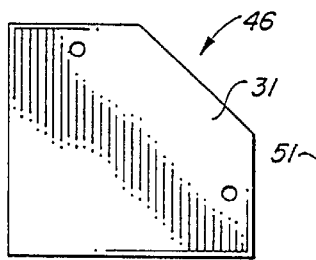
FIG. 4C3
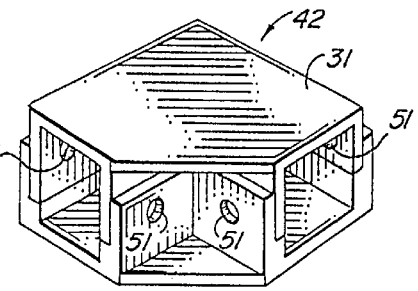
FIG. 4A
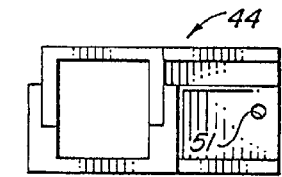
FIG. 4B3
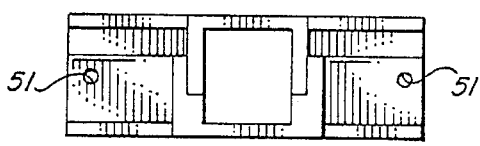
FIG. 4B1
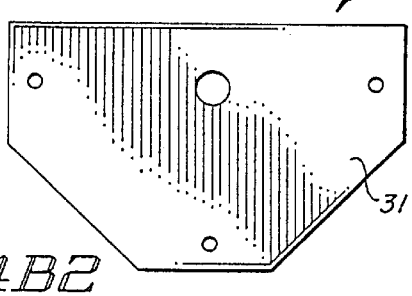
FIG. 4B2

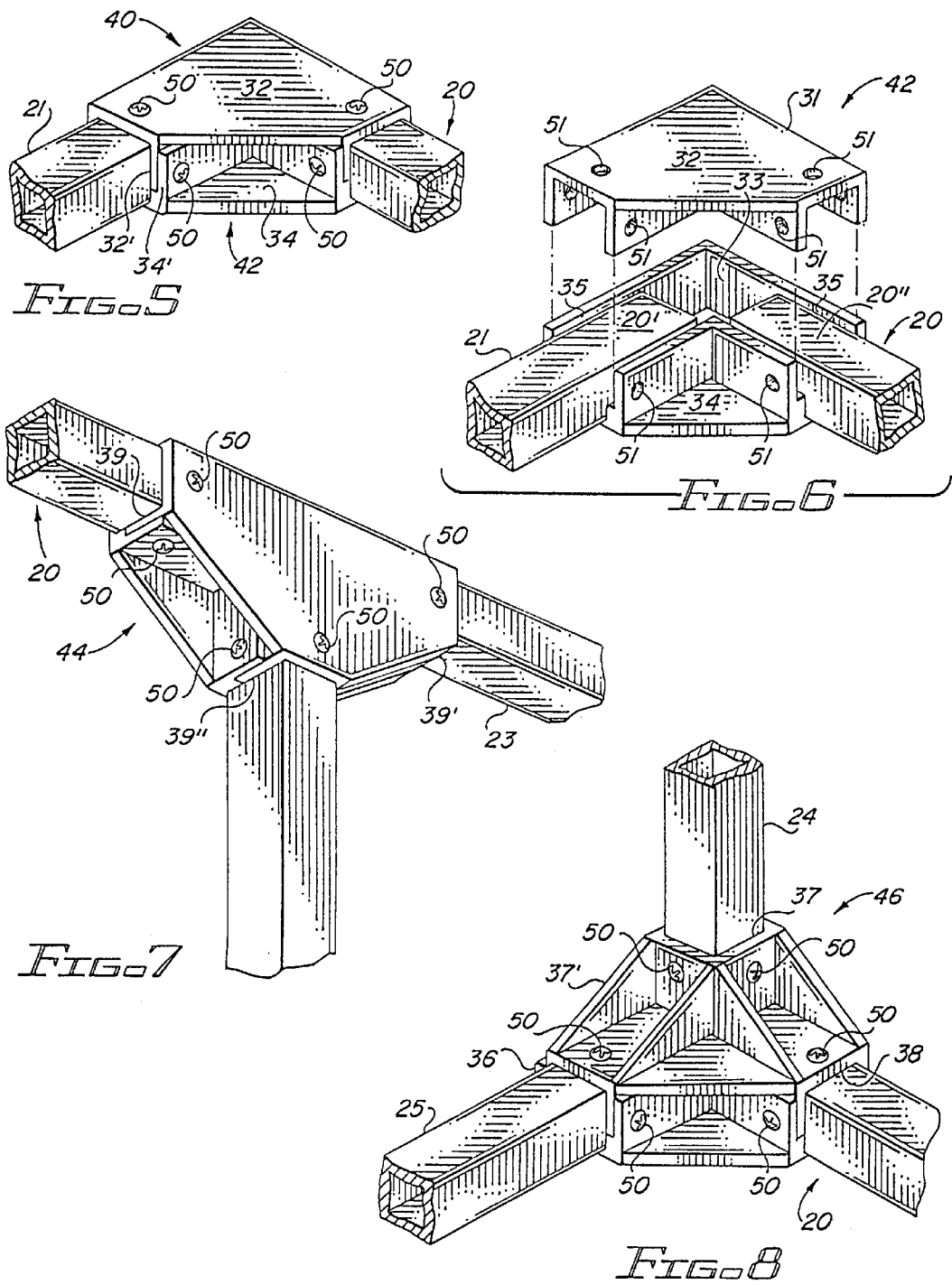

AIRCRAFT DIVAN

The present is a Continuation-in-Part to the patent application filed Sep. 12, 1994 having Ser. No. 08/304,799, now U.S. Pat. No. 5,624,160.

BACKGROUND OF THE INVENTION

1. Field of the Invention

The present invention relates to an aircraft divan to be utilized within a passenger compartment of an aircraft so as to provide a comfortable, strong, yet substantially lightweight seating assembly for passengers within the aircraft. The divan being structured to be easily and effectively mounted in an adjusted, variably aligned orientation, depending upon the spacing constraints of the aircraft.

2. Description of the Related Art

Many private as well as commercial aircraft, due to the desire to provide a substantially elegant and comfortable appearance and due to their manner of use, deviate substantially in their interior accommodation from what is generally encountered in most commercial, mass transit aircraft. In order to provide a comfortable "lounging" environment or multi-passenger seat assemblies, specially constructed divans (sitting or lounging assemblies in the form of chairs and sofas) are utilized. These divans must be constructed to strict specifications, due to the substantial guidelines set forth by aviation regulation committees such as the Federal Aviation Administration (FAA), such that the use of conventional furnishings secured within the aircraft will not suffice.

In particular, the FAA places significant structural requirements on all interior aircraft furnishings, the structural requirements generally relating to the amount of load they can support and more importantly, to their crash resistance or "crash worthiness." As such, these furnishings, such as divans, can generally not be framed of wood, but rather must be made of a strong, rigid metal.

Presently, high strength steel tubing is utilized to construct divan frames. Steel tubing is the preferred metal material because of its high strength, and further, because it meets the FAA requirements when formed into a framing structure. More importantly, steel tubing is readily available in varying dimensions and can be relatively easily welded to construct a strong divan frame, whereas other materials cannot be as easily welded. However, there are substantial drawbacks involved with using the steel tubing which necessitate an improved method of constructing an aircraft divan. Specifically, one drawback is the requirement that all welded tubing segments be formed of a like metal in order to insure appropriate securing. Another drawback is that the welding of materials is both time consuming and requires special skills and training in order to be performed. Yet another and highly important drawback to welded steel structures, involves the substantial weight associated with the use of steel tubing or other weldable materials of sufficient strength. Because weight is such an important consideration in the flight time and fuel consumption of an aircraft, the incorporation of sizeable furnishings utilizing the steel tubing can seriously diminish the fuel economy of the aircraft. Therefore, heavy, welded steel frame divans are not only an appreciable cost to the consumer when purchased and installed, but also will provide a significant added cost to the operation of the aircraft containing those furnishings. Moreover, because of the generally nature of welding, such as due to warping and deflection, welded structures are highly susceptible dimension and tolerance variations.

Accordingly, there is a substantial need in the art for an aircraft divan which can be constructed in such a manner so as to meet the structural requirements for use in an aircraft, while minimizing the additional weight which must be carried by an aircraft utilizing the furnishings. The structure of the present invention is constructed specifically to meet the needs by utilizing strong, yet lightweight, weldable or non-weldable tubing in such a manner as to form a strong rigid frame as required for aircraft furnishings.

Additionally, it is further noted that when installing various interior furnishings space constraints are usually a significant consideration. For example, it is often preferred to mount various seating assemblies such as divans very close to bulkheads or side walls of the aircraft. Such mounting, however, is not always feasible with existing designs, because standard mounting fixtures can often not be positioned as close as desired to the vertical wall assembly. In particular, the floor mounts must be effectively secured at a stable, rigid, preset location, which usually required at least a small off set from the vertical wall. Moreover, it is often desirous to mount various interior furnishings along a similar fastening point and utilizing the same mounting fixture such that some compromise as to the precise mount location for the mounting fixture must be made. As such, a certain degree of off set is usually required and it would be beneficial to provide a divan assembly which can compensate for the required off set, while still providing for secure and stable fastening within the aircraft. Moreover, because of the limitations associated with the actual fastening points within the aircraft and at a seat track, the dimensional inaccuracies of welded designs can often substantially complicate installation. As such, a more precisely constructed and dimensioned divan assembly would be highly beneficial.

SUMMARY OF THE INVENTION

The present invention is directed to an aircraft divan to be utilized on an aircraft in order to allow passengers on the aircraft to sit comfortably, and/or rest various articles, within the passenger compartment. The divan includes a strong, stable support surface disposed within the aircraft, and a seat track coupled to that support surface. Moreover, the seat track includes at least one mount position.

Secured to the seat track, preferably at the mount position, is a strong, rigid base structure. The base structure includes a number of substantially strong, yet lightweight frame members and a plurality of substantially strong, yet lightweight connectors. The connectors are structured and disposed to connectingly receive adjacently disposed frame members in order to secure the frame members to one another and define the strong, rigid base structure.

Included as part of each of the connectors is an exterior wall structure which defines at least one interior cavity and at least two frame member receiving openings. In particular, the frame member receiving openings are structured and disposed so as to receive a frame member therethrough into securing disposition within the interior cavity of the connector. Utilizing a plurality of the frame members secured together by the connector, the base structure is defined. Further, fastening means are utilized with each connector to secure the frame members within the interior cavity of the connectors and ensure that the strong, rigid base structure is maintained.

Further provided and structured to connectingly receive at least two frame members is at least one fitting assembly. Specifically, the fitting assembly includes at least one fastener segment and is structured to be matingly coupled with the seat track, thereby functioning to effectively maintain the rigid base structure defined by the frame members secured to the seat track.

It is an object of the present invention to provide an aircraft divan which is substantially strong and rigid so as to meet the FAA strength and crash worthiness requirements for interior furnishings of an aircraft.

Also an object of the present invention is to provide an aircraft divan which can be effectively mounted adjacent to a vertical wall structure in a rapid and adjustable manner.

A further project of the present invention is to provide an aircraft divan including a mounting seat track to which the base structure can be mounted in an offset manner, thereby permitting effective mounting in tight areas and permitting other furniture items to be effectively secured to the seat track as well.

Still another object of the present invention is to provide a strong aircraft divan which is substantially lightweight relative to existing divans, cutting the weight of the divan almost in half and thereby substantially minimizing the weight which must be transported by the aircraft.

An additional object of the present invention is to provide an aircraft divan which will substantially increase the fuel economy of an aircraft by reducing the overall weight which must be carried by the aircraft.

Yet another object of the present invention is to provide an aircraft divan which is substantially strong, yet lightweight and which will be substantially easy and cost effective to construct.

A further object of the present invention is to provide aircraft divan which is substantially strong yet lightweight and is capable of being quickly and easily constructed in a variety of sizes and designs.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the aircraft divan of the present invention.

FIG. 2 is a perspective view of the base structure of the aircraft divan of the present invention.

FIG. 3 is a cross-sectional view of the invention taken along line 3—3 of FIG. 1.

FIG. 4-A is an isolated view of a two-way corner connector.

FIG. 4-B1, 4-B2, & 4-B3 illustrate isolated views of a three way support connector.

FIG. 4-C1, 4-C2, & 4-C3 illustrate isolated views of a three way corner connector.

FIG. 5 is a perspective view of a two-way corner connector with the end zones of two tubular frame members secured therein.

FIG. 6 is an exploded view of the connector shown in FIG. 5 and clearly illustrating a preferred form of a connector having first and second interlocking segments.

FIG. 7 is a perspective view of a three way support connector with the end zones of three frame members secured therein.

FIG. 8 is a perspective view of a three-way corner connector with the end zones of three frame members secured therein.

Like reference numerals refer to like parts throughout the several views of the drawings.

DETAILED DESCRIPTION OF THE PREFERRED EMBODIMENT

Figure 9:
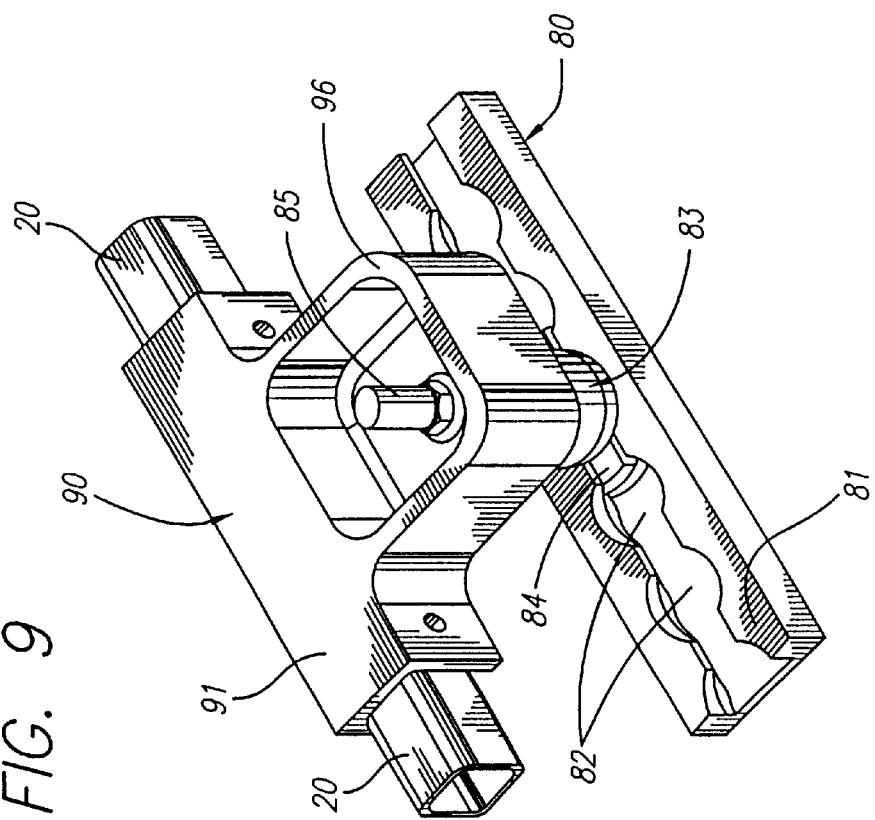
FIG. 9 is an isolated perspective view of a first embodiment of the fitting assembly of the present invention.

As shown throughout the figures, the present invention is directed towards an aircraft divan, generally indicated as 10. The aircraft divan will preferably be constructed in a sofa-type configuration, as illustrated in FIG. 1, although it may be constructed in a chair, stool, foot rest, bench, or other support configuration, and is structured to be securely fastened within the passenger compartment of an aircraft, thereby providing strong, comfortable seating for passengers within the aircraft.

Specifically, the aircraft divan includes a strong, rigid, base structure which will be secured to a support surface within the aircraft, such as a floor within the aircraft, and which base structure substantially defines the configuration of the divan. As illustrated in FIG. 1, this base structure is formed primarily from a plurality of substantially strong yet lightweight frame members generally indicated at 20, and more specifically, 21 through 29. These frame members, which preferably have a tubular configuration and can have a round, square, or any other geometric configuration, will preferably be formed of a hollow tubing and will most preferably be formed of a high strength aluminum alloy. The high strength aluminum alloy, which is generally not easily weldable and therefore, is not used in conventional divan structures, is sized and structured into substantially lightweight tubes which have a strength sufficient to meet the FAA crash load testing requirements. In particular, the assembly of the present invention is structured to be equivalently structurally certified to steel construction assemblies that are twice the weight. Of course, solid frame members having square, rounded, I-beam or any other configuration may be correspondingly 20' utilized.

Referring now to FIG. 2, the invention is seen to include a plurality of substantially strong, yet lightweight connectors generally indicated as 40, and more particularly, 42, 44, 46 and 48, which are disposed to connect the various frame members 20, to one another. These connectors, which preferably will also be formed of a high strength aluminum alloy, can be formed of any strong, durable material, as they will not be welded to the frame members, 20 and therefore do not need to be of a like material. The connectors 40, which can be of one or multiple piece construction are structured to secure the frame members to one another in such a manner as to define the strong rigid base structure, each connector connectingly receiving at least two adjacently disposed frame members 20. Referring now to FIGS. 2, 4A–C and 5–8, defining the structure of each of the connectors is an exterior wall structure 31. This exterior wall structure 31 will preferably define at least one interior cavity 33 and at least two frame member/tube receiving openings 35 of the connector, perhaps best illustrated in FIG. 6. It will be appreciated that each of tube receiving openings 35 of connectors 40 are structured and disposed to connectingly receive and axially surround an end zone 20' or 20" of one of the frame members 20 therethrough, such that the end zones of adjacently disposed frame members 20 can pass through the tube receiving opening 35 and into the interior cavity 33, where the end zone of the frame member can be maintained in a secured, fixed position within the interior cavity 33 of the connector 40. Moreover, the end zones 20' and 20" preferably include a beveled configuration so as to matingly engage one another and support one another within the connector.

The two tube receiving opening connector shown in FIG. 5, will define a two-way corner connector 42, such as will be used on the seat back portion of the divan, as illustrated in FIG. 2. Additionally, two interior cavities may be defined within the connector, each tube receiving opening 35 accessing a particular interior cavity wherein an end zone of the frame members 20 will be secured. A majority of the connectors, however, include three way connectors, 44 and 46 which are best illustrated in FIGS. 2, 7 and 8. In such a case, there will be three tube receiving openings 36, and at least two of these tube receiving openings, 37 and 38 will preferably be perpendicularly disposed relative to one another to help define a corner. When forming a rectangular or square type base structure, it will be appreciated from FIGS. 2 and 8 that the third tube receiving opening of the three way connector will also be perpendicularly disposed relative to the other two tube receiving openings, therefore extending into three perpendicular planes for receiving frame members 20. Further, in such a connector, either one, two or three interior cavities may be defined within the connector.

Similarly, a three way support connector 44 can be included for use with various support segments throughout the base structure. In particular and as best shown in FIG. 7, two of the tube receiving openings 39 and 39' of the three way support connector 44 can be in line with one another to either connect two adjacent frame members in line with one another or to be disposed about a mid portion of a single frame member. In this case, the third tube receiving opening 39" of the connector can extend in a direction perpendicular from the other two tube receiving openings or can be angled in any of a variety of configurations to provide additional support or cross braces utilizing the frame members.

The various connectors 40 of the present invention can be formed of a single molded or machined piece wherein the frame members will slide into the interior cavity of the connector through one of the tube receiving openings, such as shown in FIG. 2, or can be formed of a number of interlocking segments, such as illustrated in FIGS. 4A–C and FIGS. 5–8. In the preferred embodiment, each connector will include at least two interlocking segments, namely a first interlocking segment 32 and a second interlocking segment 34. These first and second interlocking segments are adapted to be fitted within one another so as to interlock in sandwiching relation about an end zone of a frame member 20. In particular, and as best shown in FIG. 5, there can be a male segment 32' formed on first interlocking segment 32 and a female segment 34' formed on second interlocking segment 34, the male segment 32' being structured to be fitted within the female segment 34' so as to surround and captivate an end zone of a frame member therein and within the interior cavity defined upon the interlocking segments being connected with one another. In the case of a two way connector, 42 at least one but possibly two interior cavities within the connector are exposed when the interlocking segments are separated such that an end zone of adjacent tubular frame members can be laid in place within one of the interlocking segments until the other interlocking segment is secured thereon in sandwiching relation about the tubular frame members. Similarly, in the case of a three way support connector, 44 the interlocking segments will also preferably be two like halves, with one being male and one being female. Accordingly, the connector can more easily be fitted over a mid portion of one of the tubular frame members for facilitated construction, rather than requiring that the connector be slid over the length of the tubular frame member to its desired location. Finally, in the case of a three way, corner type connector, 46 one of the interlocking segments will preferably include an integrally formed extension portion 37' which defines a third of the tube receiving openings. As seen in FIG. 8, in such a case, an end zone of one of the tubular frame members 24 will be slid into the third tube receiving opening 37, of integrally, pre-formed extension portion 37' and the connector 46 can be positioned to sandwich the end zones of the other adjacent tubular frame members. Although this is the primary configuration for the individual connectors, it can be molded in any number of interlocking segments so as to ensure quick and easy fabrication of the base structure. It will also be appreciated from FIG. 2 that a four way connector 48, will also be utilized in the divan which can be formed in the same manner and of similar structure as connectors 42, 44 and 46.

Once the frame members 20 are secured within the various connectors 40 so as to define the base structure, the frame members are fixedly maintained in position by fastening means. As illustrated in FIGS. 5, 6 and 7, these fastening means 50 can take the form of rivets, screws, bolts, straps, or any other suitable fastener which will firmly and securely hold the frame members in place within the connectors. Further, each of the connectors 42, 44, 46 and 48 and frame members 20 will preferably include pre-formed openings 51 formed therein to more easily define the positioning of said fastening means and facilitate passage of the fastening means therethrough, although the openings 51 can equivalently be formed upon fabrication of the base structure, or can be eliminated altogether if using a strap or clamp-type fastening means to secure the frame members 20 within the various connectors 40.

Secured in spanning relation between select ones of the frame segments are at least one but preferably a number of panel members, generally indicated at 60. The panel members define exterior faces of the divan and are preferably thin, lightweight metal panels 60 which are secured to the frame members 20 by fastening means such as those utilized to secure the frame members 20 within the connectors 40. Although the panel members can be formed of any substantially strong, weight supporting material, and in fact can be formed of wood or a variety of strong fabrics or meshes, they will preferably be formed of aluminum sheets. Additionally, these aluminum sheets can include a number of cutouts along the surface thereof to minimize the overall surface area of the panel and thereby reduce the overall weight of the panels without minimizing its supporting strength. The panel members 60 will be disposed so as to define a seat of the base structure, one or a number of panels being usable to define the seat, but depending upon the use of the divan and the requirements of its construction and its weight limitation, all exterior faces of the base structure can be defined by one or a plurality of panel members.

Disposed atop the exterior faces, as preferably defined by the panel members, 70 is padding. The padding, 70 which is provided to add comfort to the divan, need not be included in a bench-type configuration of the divan, but preferably will be included for added comfort. Additionally, in order to give the divan its attractive exterior appearance, when needed, external upholstery 72 will be utilized to substantially cover any padding 70 and the base structure.

The aircraft divan is structured such that it can be formed in any of a variety of shapes and configurations to meet the needs of a particular aircraft passenger compartment. Further, the connectors 40 of the present invention can also be easily adapted to include extensions by which the aircraft divan can be mounted to other furnishings within the passenger compartment or directly to the aircraft itself in order to provide secure, stable positioning of the divan within the aircraft. In the preferred embodiment, however, the base structure is secured to a seat track 80, as seen in FIG. 9.

Specifically, the seat track 80 preferably includes a strong material construction and includes an elongate channel 81. Moreover, the seat track 80 is preferably secured, such as through bolts or rivets, directly to a support surface within the aircraft. Of course, that support surface can include a floor of the passenger compartment and/or some other rigid structure within the aircraft.

Defined within the elongate channel 81 are a plurality of spaced apart apertures 82. Each of the apertures 82 defines one of preferably a plurality of mount positions of the seat track 80. In particular, each of the mount positions is disposed to allow for precise positioning of the divan and/or any other interior fixture within the aircraft. In a typical design, the mount positions are spaced in approximately one inch increments.

Extending from and coupled to the seat track 80 is at least one elongate lock segment 83. The lock segment 83, which may include a bolt or like fastener, preferably includes a flanged end 84, which is disposed within the elongate channel 81 of the seat track 80, and a main body 85, which extends outwardly from the elongate channel 81 through one of the apertures 82 that defines a select mount position. In a preferred embodiment, the apertures 82 are interconnected with one another such that the lock segment 83 may slide along the seat track 80 to a desired mount position, an exterior bolt, clamp or alternative fastening article being utilized to securely couple the flanged end and therefore the lock segment 83 at the select mount position.

As illustrated in FIG. 9, the main body 85 of the elongate lock segment 83 is structured to be coupled with a fitting assembly 90. Specifically, the divan of the present invention preferably includes at least one fitting assembly 90 structured to securely couple the rigid base structure to the seat track 80. As such, the lock segment 83 need not be mounted directly through the frame members themselves. Such a configurations provides the advantage of requiring a shorter lock segment 83, which thereby lessens the overall weight of the assembly and does not affect stowability.

In the preferred embodiment, the fitting assembly 90 includes a coupler section 91 and a fastener segment 96. The coupler section 91 is preferably structured to connectingly receive at least two frame members 20 therein, although it may be mounted on a single section of a frame member. In this regard, the coupler section 91 may include a single piece bracket construction, or may include multiple segments to hold the frame members 20 in a sandwiched configuration much like is employed by the connectors 40. To further secure the frame members 20 in the coupler section 91 fastening means such as screws, bolts, clips, ties or rivets are also provided.

Figure 10:
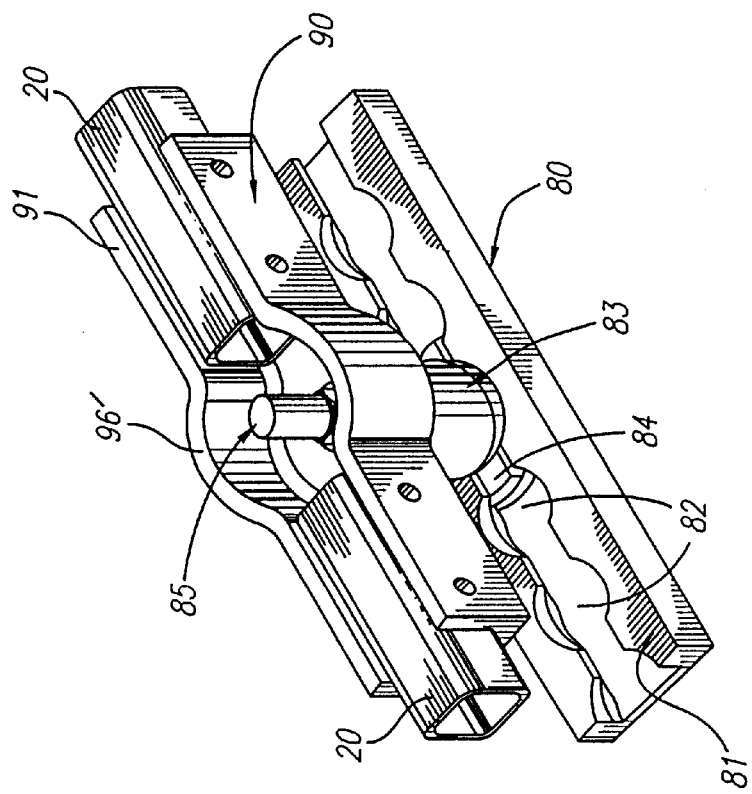
FIG. 10 is an isolated perspective view of a second embodiment of the fitting assembly of the present invention.

As indicated, the fitting assembly 90 further includes a fastener segment 96. In one embodiment, as illustrate in FIG. 10, the fastener segment 96' may be in line with the coupler section 91 to provide for in line fastening. In a preferred embodiment, however, as illustrated in FIG. 9, the fastener segment 96 protrudes outwardly from, and is off set from, the coupler section 91. As such, the fastener segment 96 can attach the base structure to the seat track 80 in a non-aligned orientation. For example, it may necessary to secure the seat track 80 in a position slightly spaced from a vertical surface, such as for strength and stability considerations or so as to provide for a more central fastening point to with other items may be secured. In such a circumstance, the divan of the present invention can still be effectively and securely mounted flush with that vertical surface.

The fastener segment 96 itself preferably includes a rigid frame construction to define a port. The port is structured to receive the main body 85 of the elongate lock segment 83 therethrough for effective secure fastening, such as utilizing a bolt, clamp, etc. Moreover, it is preferred that the port not be pre-formed, but rather that it be made at installation. For example, it is noted that the seat track 80 has preset mount positions at regularly spaced intervals. First, due to the precision with which the divan of the present invention can be constructed due to its use of connectors rather than welding, substantially precise positioning of the fitting assemblies over a desired mount point can be achieved. Still, to provide even greater precision and adjustability, the port itself is not formed until installation to match the location of the lock segment with great precision.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An aircraft divan for use within a passenger compartment of an aircraft, said aircraft divan comprising:
    (a) a support surface;
    (b) a seat track coupled to said support surface, said seat track including at least one mount position,
    (c) a strong rigid base structure adapted to be secured to said seat track, said base structure including a plurality of substantially strong, yet lightweight frame members,
    (d) a plurality of substantially strong, yet lightweight connectors, each one of said plurality of connectors being structured and disposed to connectingly receive at least two of said frame members, and each one of said connectors including an exterior wall structure defining at least one interior cavity and at least two frame member receiving openings;
    (e) fasteners structured to securely maintain said frame members within said connectors so as to define said strong, rigid base structure;
    (f) at least one fitting assembly structured to connectingly receive at least two of said frame members, said fitting assembly including at least one fastener segment structured to be matingly coupled with said seat track so as to effectively secure said rigid base structure to said seat track; and
    (g) each of said connectors comprising:
        a first interlocking segment and a second interlocking segment, said first interlocking segment structured to at least partially receive said second interlocking segment,
        said first and second interlocking segments being structured to be interlockingly connected with one another in sandwiching relation about at least one end zone of said frame members, and
        each of said frame member receiving openings being structured and disposed to receive and surround one of said end zones of one of said frame members therethrough and to maintain said end zone of said frame member in a secured, fixed position within said interior cavity of said connector.

2. An aircraft divan as recited in claim 1 wherein said fitting assembly includes fastening means structured to securely maintain said frame members within said fitting assembly.

3. An aircraft divan as recited in claim 1 wherein said fastener segment includes a port defined therein, said port being structured to receive an elongate lock segment, which extends from and is coupled to said seat track, therethrough for coupled engagement.

4. An aircraft divan as recited in claim 1 wherein said seat track includes a plurality of spaced mount positions.

5. An aircraft divan as recited in claim 1 wherein said fitting assembly includes a coupler section wherein said frame members are connectingly received, and said fastener segment is structured to protrude outwardly from said coupler section so as to be effectively coupled to said seat track upon said seat track being non-aligned with said frame members.

6. An aircraft divan as recited in claim 1 wherein said seat track includes an elongate channel, said channel having a plurality of spaced apart apertures defined therein, each of said apertures defining one of said mount positions.

7. An aircraft divan as recited in claim 6 further including an elongate lock segment extending from and coupled to said seat track, said elongate lock segment including a flanged end structured to be disposed within said elongate channel of said seat track while a main body of said elongate lock segments protrudes outwardly from said elongate channel through one of said apertures defined in said elongate channel, said flanged end being structured to maintain said elongate lock segment coupled to said seat track.

8. An aircraft divan as recited in claim 7 wherein said fastener segment includes a port defined therein, said port being structured to receive said main body of said elongate lock segment therethrough for coupled engagement therewith.

9. An aircraft divan as recited in claim 8 wherein said fitting assembly includes a coupler section wherein said frame members are connectingly received, and said fastener segment is structured to protrude outwardly from said coupler section so as to be effectively coupled to said elongate lock segment despite said seat track being non-aligned with said frame members.

10. An aircraft divan as recited in claim 1, wherein said exterior wall structure of at least one of said connectors defines at least three frame member receiving openings.

11. An aircraft divan as recited in claim 10, wherein at least two of said at least three frame member receiving openings are disposed in perpendicular relation to one another so as to define a corner of said base structure.

12. An aircraft divan for use within a passenger compartment of an aircraft, comprising:

(a) a strong rigid base structure adapted to be secured to a support surface within the aircraft, said base structure including a plurality of substantially strong, yet lightweight frame members, (b) a plurality of substantially strong, yet lightweight connectors, each one of said plurality of connectors being structured and disposed to connectingly receive at least two of said frame members, each of said connectors including an exterior wall structure defining at least one interior cavity and at least two frame member receiving openings, each of said connectors comprising a first interlocking segment and a second interlocking segment, said first interlocking segment structured to at least partially receive said second interlocking segment and said first and second interlocking segments being structured to be interlockingly connected with one another in sandwiching relation about at least one end zone of said frame members;

each of said frame member receiving openings being structured and disposed to receive and surround one of said end zones of one of said frame members therethrough and to maintain said end zone of said frame member in a secured, fixed position within said interior cavity of said connector, and (c) fastening means structured to securely maintain said frame members within said connectors so as to define said strong, rigid base structure.

13. An aircraft divan for use within a passenger compartment of an aircraft, said aircraft divan comprising:

(a) a support surface;

(b) a seat track coupled to said support surface, said seat track including at least one mount position, (c) a strong rigid base structure adapted to be secured to said seat track, said base structure including a plurality of substantially strong, yet lightweight frame members, (d) a plurality of substantially strong, yet lightweight connectors, each one of said plurality of connectors being structured and disposed to connectingly receive at least two of said frame members, and each one of said connectors including an exterior wall structure defining at least one interior cavity and at least two frame member receiving openings;

(e) at least one fitting assembly structured to connectingly receive at least two collinear ones of said frame members so as to secure said frame members with one another, (f) said fitting assembly including a coupler section wherein said frame members are connectingly received, and (g) said fitting assembly including at least one fastener segment and at least one lock segment, said lock segment structured to matingly couple said fastener segment with said seat track so as to effectively secure said rigid base structure to said seat track.

14. An aircraft divan as recited in claim 13 wherein said fastener segment is structured to protrude laterally outward from said coupler section and said frame members disposed therein so as to be securely coupled to said seat track upon said seat track being non-aligned with said frame members.

* * * * *